United States Patent Office 3,331,082
Patented July 11, 1967

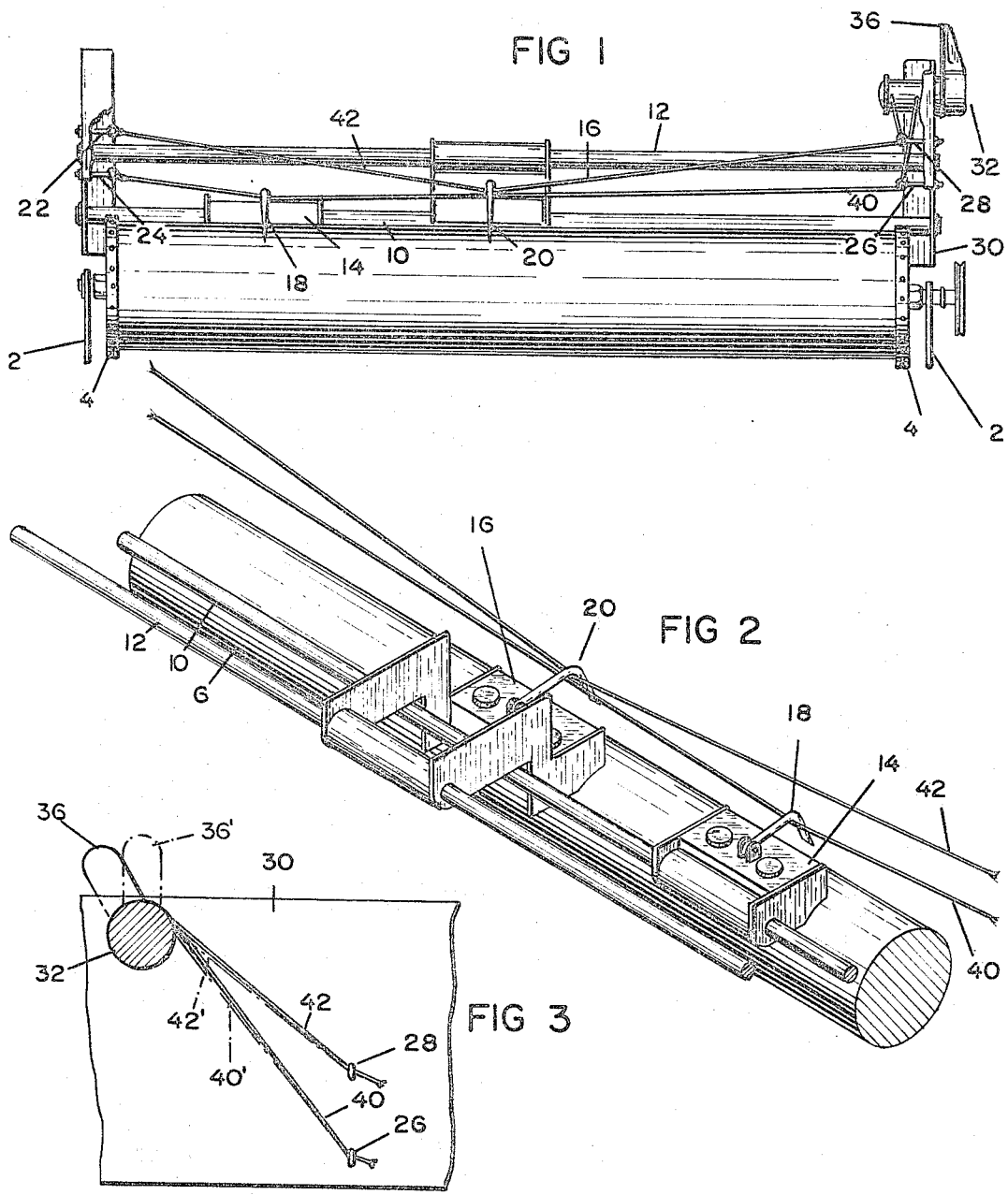

3,331,082
PEN LIFTING ATTACHMENT FOR RECORDING INSTRUMENTS
Marion S. Sheets, Dumas, Tex., assignor to Continental Carbon Company, Houston, Tex., a corporation of Delaware
Filed June 24, 1965, Ser. No. 466,740
5 Claims. (Cl. 346—139)

The present invention relates to instruments for recording varying factors of one kind or another and wherein a continuous record is made by means of a stylus cooperating with the moving surface of a recording sheet or chart. Such instruments are widely used for many purposes, including recording variations in pressure, temperature, rate of flow, gas, analysis, electrical quantities, etc.

In such recording instruments the stylus most widely used is one or more pens with accompanying ink supply or reservoir. However, the use of pens for the purpose stated has certain disadvantages among which is the tendency of the ink to continuously flow from the pen onto the recording sheet or chart, even when the recording instrument is at rest; thus resulting in the premature exhaustion of the ink supply from the reservoir together with destruction of the chart either wholly or in part.

It is among the objects of the present invention to eliminate the difficulties referred to hereinbefore by providing a pen lifting attachment for recording instruments which may be quickly and effectively operated to remove the pen from contact with the recording chart when the instrument is not in use.

Another object is to provide an attachment of the type described which is not only highly efficient in operation but which is simple and inexpensive to manufacture, install and maintain.

Another object is the attainment of the foregoing advantages with an attachment which will simultaneously handle a plurality of recording pens in the manner described.

Other objects, advantages and novel features of the invention will be apparent from the following description when read in connection with the accompanying drawings, in which:

FIGURE 1 is an end view of a strip-type recording instrument having attached thereto a device which embodies the teachings of the present invention;

FIGURE 2 is a fragmentary perspective view illustrating the recording pens in raised and inoperative position; and FIGURE 3 is a fragmentary view illustrating certain operating elements in greater detail.

Referring more particularly to the drawings, the numeral 2 designates the frame of a strip-type recording instrument which rotatably supports the chart roll 4 carrying the chart 6 upon which the recordings are to be made.

Extending transversely across the frame 2, and above the chart roll 4, are spaced parallel rods 10 and 12.

As will be observed, the transversely extending spaced parallel rods 10 and 12 are disposed in different horizontal and vertical planes with the rod 10 located closer to the chart roll 4.

Slidably mounted on each of the rods 10 and 12 is a unitary pen carrier and ink reservoir, the same being designated at 14 and 16, respectively. The pens of these unitary pen carriers and ink reservoirs which are shown at 18 and 20 are pivotally mounted and adapted for light contact with the adjacent surfaces of the strip-type recording sheet or chart 6.

Due to the greater elevation of the rod 12 with respect to the recording sheet or chart 6, the unitary pen carrier and ink reservoir 16 is provided with pen supporting means of greater height than the corresponding means on the lower unitary pen carrier and ink reservoir 14.

One of the side members of the frame 2 carries a pair of relatively spaced inwardly extending eye-bolts 22 and 24 which are disposed above the adjacent ends of the rods 10 and 12, respectively; and similar inwardly extending eye-bolts 26 and 28 are correspondingly mounted on the opposite side member of the frame.

Secured to that side member of the frame 2 which carries the inwardly extending eye-bolts 26 and 28 is an assembly plate 30 which rotatably supports one end of an inwardly extending cylindrical drum 32 which is shown as provided with an annular flange adjacent its inner and unsupported end.

The journaled end of the cylindrical drum 32 extends outwardly through the assembly plate 30 and is secured to a radially extending manually operable lever 36.

As will become more apparent shortly hereinafter, the device of the invention is operated through a flexible string or light wire, two of the same being shown in the drawings at 40 and 42. According to this illustrative embodiment, one end of the string or light wire 40 is secured to the eye of the eye-bolt 22 and extends under the pen 18 which is pivotally mounted on the unitary pen carrier and ink reservoir 14, then passing through the eye of the eye-bolt 26, finally being secured to the cylindrical drum 32 adjacent the inner surface of the assembly plate 30. Correspondingly, the string or light wire 42 is secured at one end to the eye of the eye-bolt 24, extends under the pen 20 which is pivotally mounted on the unitary pen carrier and ink reservoir 16, and then through the eye of the eye-bolt 28 to be finally secured to the cylindrical drum 30 adjacent its inwardly extending and unsupported end.

According to the foregoing construction and arrangement slight manual movement of the lever 36 will cause the partial rotation of the cylindrical drum 30 with the result that there is taken up on its sufficient lengths of the string or light wires 40 and 42 to raise the pivotally mounted pens 18 and 20 from contact with the chart 6 on the chart roll 4. The reverse movement of the manually operated lever 36 on the cylindrical drum 30 will cause the reeling off of the strings or light wires 40 and 42 sufficiently to cause the pivotally mounted pens 18 and 20 to resume light contact with the chart 6.

Referring to FIGURE 3, the reference numerals 36', 40' and 42' respectively illustrate the radially extending manually operable lever 36 and the strings or light wire 40 or 42 in the released or slack positions.

It will be understood that any of a number of suitable frictional braking means may be employed to prevent the unintentional unwinding of the cylindrical drum; such as serrated plate, spring tongue, etc.

Having thus disclosed the invention, what I claim as new and desire to secure by Letters Patent is:

1. The combination with a recording instrument having a liftable recording pen, of a pen lifting device comprising an attenuated flexible line disposed over the recording chart and under the liftable portion of the recording pen; means at one side of said recording instrument for securing one end of said flexible line above and laterally spaced from said chart; means at the opposite side of said recording instrument for contacting said flexible line and diverting it away from said chart; and collecting means for receiving a sufficient length of the diverted portion of said flexible line to cause said flexible line to contact the underside of the liftable portion of the recording pen and move the point thereof out of contact with said chart.

2. The combination with a recording instrument having a liftable recording pen, of a pen lifting device comprising an attenuated flexible line disposed over the recording chart and under the liftable portion of the recording pen; means at one side of said recording instrument for securing one end of said flexible line above and laterally spaced from said chart; means at the opposite side of said recording instrument for contacting said flexible line and diverting it away from said chart; and manually operable collecting means for receiving a sufficient length of the diverted portion of said flexible line to cause said flexible line to contact the underside of the liftable portion of the recording pen and move the point thereof out of contact with said chart.

3. The combination with a recording instrument having a plurality of lifting recording pens, of pen lifting means comprising a plurality of attenuated flexible lines disposed over the recording chart and under the liftable portions of said plurality of recording pens; and a single means for moving said flexible lines away from said chart sufficiently to cause said flexible lines to contact the undersides of the liftable portions of the recording pens and move the points thereof out of contact with said chart.

4. The combination with a recording instrument having a plurality of liftable recording pens, of pen lifting means comprising a plurality of attenuated flexible lines disposed over the recording chart and under the liftable portions of said plurality of recording pens; means at one side of said recording instrument for separately securing one end of each of said flexible lines above and laterally spaced from said chart; means at the opposite side of said recording instrument for separately contacting each of said flexible lines and diverting it away from said chart; a single collecting means for receiving a sufficient length of each of the diverted portions of said flexible lines to cause said flexible lines to contact the underside of the liftable portions of the recording pens and move the points thereof out of contact with said chart; and means for actuating said collecting means.

5. The combination with a recording instrument having a plurality of liftable recording pens, of pen lifting means comprising a plurality of attenuated flexible lines disposed over the recording chart and under the liftable portions of said plurality of recording pens; means at one side of said recording instrument for separately securing one end of each of said flexible lines above and laterally spaced from said chart; means at the opposite side of said recording instrument for separately contacting each of said flexible lines and diverting it away from said chart; a single collecting means for receiving a sufficient length of each of the diverted portions of said flexible lines to cause said flexible lines to contact the underside of the liftable portions of the recording pens and move the points thereof out of contact with said chart; and manually operable means for actuating said collecting means.

References Cited

UNITED STATES PATENTS 1,847,918   3/1932   Blanchard _____ 346—68

RICHARD B. WILKINSON, *Primary Examiner.*

M. LORCH, *Assistant Examiner.*